US011462128B2

(12) United States Patent
LiKamWa et al.

(10) Patent No.: US 11,462,128 B2
(45) Date of Patent: Oct. 4, 2022

(54) METHOD AND APPARATUS FOR SIMULATED HYDRODYNAMICS IN MIXED-REALITY FLUID VESSELS

(71) Applicant: Arizona Board of Regents on Behalf of Arizona State University, Scottsdale, AZ (US)

(72) Inventors: Robert LiKamWa, Tempe, AZ (US); Shahabedin Sagheb, Tempe, AZ (US); Alireza Bahremand, Mesa, AZ (US); Byron Lahey, Scottsdale, AZ (US); Frank Wencheng Liu, Tempe, AZ (US); Assegid Kidane, Scottsdale, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 524 days.

(21) Appl. No.: 16/657,972

(22) Filed: Oct. 18, 2019

(65) Prior Publication Data

US 2020/0160750 A1 May 21, 2020

Related U.S. Application Data

(60) Provisional application No. 62/769,798, filed on Nov. 20, 2018.

(51) Int. Cl.
*G06T 19/00* (2011.01)
*G09B 23/12* (2006.01)
(Continued)

(52) U.S. Cl.
CPC ............ *G09B 23/12* (2013.01); *G01M 1/122* (2013.01); *G06T 19/006* (2013.01); *G09B 9/00* (2013.01); *G06T 2210/24* (2013.01)

(58) Field of Classification Search
CPC ........ G06T 19/006; G09B 23/12; G09B 9/00; G01M 1/122
(Continued)

(56) References Cited

U.S. PATENT DOCUMENTS 9,038,961 B2 * 5/2015 Deslandes ............... G06F 30/20
701/4
10,796,541 B1 * 10/2020 Martin .................... G06F 3/016
(Continued)

FOREIGN PATENT DOCUMENTS

WO    2020176532 A1    9/2020

OTHER PUBLICATIONS

Amazeen, Eric, et al., "Weight perception and the haptic size—weight illusion are functions of the inertia tensor," Journal of Experimental Psychology: Human perception and performance 22, 1 (1996), p. 213.
(Continued)

*Primary Examiner* — Thomas J Lett
(74) *Attorney, Agent, or Firm* — Elliott, Ostrander & Preston, P.C.

(57) ABSTRACT

A haptic feedback system to stimulate physical sensation of handling a fluid in virtual spaces. The system includes a physical vessel containing a solid object and mechanical means to move the solid object therein, a virtual reality module to track a position of the physical vessel and a corresponding virtual vessel, logic to simulate a fluid contained in the virtual vessel based on the tracked position of the virtual vessel, logic to calculate coordinates of a center of gravity for the simulated fluid based on the tracked position of the virtual vessel, logic to translate the calculated coordinates of the center of gravity for the simulated fluid into cylindrical coordinates to which to move the solid object in the physical vessel, and logic to send instructions
(Continued)

to the mechanical means to move the solid object in the physical vessel based on the cylindrical coordinates to shift the weight of the physical vessel in accordance with the center of gravity of the simulated fluid in the virtual vessel.

19 Claims, 15 Drawing Sheets

(51) Int. Cl.
  *G01M 1/12* (2006.01)
  *G09B 9/00* (2006.01)
(58) Field of Classification Search
  USPC .......................................................... 345/633
  See application file for complete search history.

(56) References Cited

U.S. PATENT DOCUMENTS

| | | | |
|---|---|---|---|
| 2013/0216673 A1* | 8/2013 | Storek | A47J 27/002 99/332 |
| 2014/0107859 A1* | 4/2014 | Deslandes | G06F 30/20 701/1 |
| 2020/0105053 A1 | 4/2020 | Prakash et al. | |
| 2020/0160482 A1 | 5/2020 | Kodukula et al. | |

OTHER PUBLICATIONS

Andujar, J.M., et al., "Augmented Reality for the Improvement of Remote Laboratories: An Augmented Remote Laboratory," IEEE Transactions on Education 54, 3 (Aug. 2011), pp. 492-500.
Araujo, Bruno, et al., "Snake Charmer: Physically Enabling Virtual Objects," In Proceedings of the TEI'16: Tenth International Conference on Tangible, Embedded, and Embodied Interaction, ACM, (2016), pp. 218-226.
Azuma, Ronald, "A Survey of Augmented Reality," Presence: Teleoper. Virtual Environ. 6,4 (Aug. 1997), pp. 355-385.
Benko, Hrvoje, et al., "Normaltouch and texturetouch: High-fidelity 3d haptic shape rendering on handheld virtual reality controllers," (2016) In Proceedings of the 29th Annual Symposium on User Interface Software and Technology. ACM, pp. 717-728.
Chi-Yin Yuen, Steven, et al., "Augmented reality: An overview and five directions for AR in education," Journal of Educational Technology Development and Exchange (JETDE) 4, 1 (2011), p. 11.
Choi, Inrak, et al., "Wolverine: A wearable haptic interface for grasping in virtual reality," In Intelligent Robots and Systems (IROS), 2016 IEEE/RSJ International Conference on. IEEE, pp. 986-993.
Cirio, Gabriel, et al., "Six-oof haptic interaction with fluids, solids, and their transitions," In World Haptics Conference (WHC), 2013. IEEE, pp. 157-162.
Culbertson, Heather, et al., "Modeling and design of asymmetric vibrations to induce ungrounded pulling sensation through asymmetric skin displacement," In Haptics Symposium (HAPTICS), 2016 IEEE. IEEE, pp. 27-33.
Foster, Nick, et al., Realistic Animation of Liquids. Graphical Models and Image Processing 58, 5 (1996), pp. 471-183.
Gavish, Nirit, et al., "Evaluating virtual reality and augmented reality training for industrial maintenance and assembly tasks," Interactive Learning Environments 23, 6 (2015), pp. 778-798.
Goswami, Prashant, et al., "Interactive SPH simulation and rendering on the GPU," In Proceedings of the 2010 ACM SIGGRAPH/Eurographics Symposium on Computer Animation, Eurographics Association, (2010), pp. 55-64.
Gu, Xiaochi, et al, "Dexmo: An inexpensive and lightweight mechanical exoskeleton for motion capture and force feedback in VR," In Proceedings of the 2016 CHI Conference on Human Factors inComputing Systems. ACM, (2016), pp. 1991-1995.

Harada, Takahiro, et al., "Smoothed particle hydrodynamics on GPUs," In Computer Graphics International, vol. 40. SBC Petropolis, (2007), pp. 63-70.
Harley, Daniel, et al., "Sensory VR: Smelling, Touching, and Eating Virtual Reality," In Proceedings of the Twelfth International Conference on Tangible, Embedded, and Embodied Interaction, ACM, (2018), pp. 386-397.
Hashiguchi, Satoshi, et al., "Rv dynamics illusion: Psychophysical influence on sense of weight by mixed-reality visual stimulation of moving objects," In International Conference on Virtual, Augmented and Mixed Reality, Springer, (2014), pp. 55-64.
HTC, "VIVE PRO" [online], HTC Corporation, retrieved on Dec. 1, 2020 from archive.org, as it appeared on Aug. 16, 2018, retrieved from the internet, 7 pages.
Insko, Brent Edward, et al., "Passive haptics significantly enhancesvirtual environments," (2001) Ph.D. Dissertation, University of North Carolina at Chapel Hill, 111 pages.
Issartel, Paul, et al., "Perceiving mass in mixed reality through pseudo-haptic rendering of Newton's third law," In Virtual Reality (VR), 2015 IEEE, pp. 41-46.
Kaufmann, Hannes, et al., "Collaborative augmented reality in education. Institute of Software Technology and Interactive Systems" (2003), Vienna University of Technology, 4 pages.
Kimura, Zentaro, et al., "An examination on effective auditory stimulation when grasping a virtual object with a bare hand," In Advanced Image Technology (IWAIT), 2018 International Workshop on, IEEE, pp. 1-4.
Lécuyer, Anatole, et al., "Feeling bumps and holes without a haptic interface: the perception of pseudo-haptic textures" (2004), In Proceedings of the SIGCHI conference on Human factors in computing systems, ACM, pp. 239-246.
Lécuyer, Anatole, et al., "Pseudo-haptic feedback: Can isometric input devices simulate force feedback?" In Virtual Reality, 2000, Proceedings, IEEE, pp. 83-90.
Lee, Kangdon, "Augmented Reality in Education and Training," TechTrends 56, 2 (Mar. 1, 2012), pp. 13-21.
Massie, Thomas H, et al., "The phantom haptic interface: A device for probing virtual objects" (1994), In Proceedings of the ASME winter annual meeting, symposium on haptic interfaces for virtual environment and teleoperator systems, vol. 55, Citeseer, pp. 295-300.
Minamizawa, Kouta, et al., "Gravity grabber: wearable haptic display to present virtual mass sensation," In ACM SIGGRAPH 2007 emerging technologies. ACM, p. 8.
Murray, Anne M., et al., "Psychophysical characterization and testbed validation of a wearable vibrotactile glove for telemanipulation," Presence: Teleoperators & Virtual Environments 12, 2 (2003), pp. 156-182.
Niiyama, Ryuma, et al., "Weight and volume changing device with liquid metal transfer" (2014), In Proceedings of the 8th International Conference on Tangible, Embedded and Embodied Interaction, ACM, pp. 49-52.
Rustico, Eugenio, "Advances in multi-GPU smoothed particle hydrodynamics simulations," IEEE Transactions on Parallel and Distributed Systems 25, 1 (2014), pp. 43-52.
Simeone, Adalberto L., et al., "Substitutional reality: Using the physical environment to design virtual reality experiences" (2015), In Proceedings of the 33rd Annual ACM Conference on Human Factors in Computing Systems, ACM, pp. 3307-3316.
Stam, Jos, "In Proceedings of the 26th annual conference on Computer graphics and interactive techniques" (1999), ACM Press/Addison-Wesley Publishing Co., pp. 121-128.
Swindells, Colin, et al., "TorqueBAR: an ungrounded haptic feedback device" (2003), In Proceedings of the 5th International conference on Multimodal interfaces, ACM, pp. 52-59.
U.S. Appl. No. 16/898,791, filed Jun. 11, 2020, Hu et al.
Valente, Luis, et al., "Pervasive virtuality in digital entertainment applications and its quality requirements," Entertainment computing 26 (2018), pp. 139-152.
Van der Linde, Richard Q, et al., "The HapticMaster, a new high-performance haptic interface" (2002), In Proc. Eurohaptics. pp. 1-5.

(56) References Cited

OTHER PUBLICATIONS

Zines, Mauricio, et al., "Haptic display of 3D liquids for interactive applications," In Games Innovations Conference, 2009, International IEEE Consumer Electronics Society's, pp. 140-148.
Walker, Julie, et al., "Haptic orientation guidance using two parallel double-gimbal control moment gyroscopes," IEEE transactions on haptics (2017), pp. 267-278.
Webel, Sabine, et al., "An Augmented Reality Training Platform for Assembly and Maintenance Skills," Robot. Auton. Syst. 61, 4 (Apr. 2013), pp. 398-403.
Winfree, Kyle N., et al., "Control of a high fidelity ungrounded torque feedback device: The iTorqU 2.1," In Robotics and Automation (ICRA), 2010 IEEE International Conference, pp. 1347-1352.
Wu, Hsin-Kai, et al., "Current status, opportunities and challenges of augmented reality in education," Computers & education 62 (2013), pp. 41-49.
Yang, Zhizhuo, et al., "Perceptual Issues of a Passive Haptics Feedback Based MR System," In Mixed and Augmented Reality (ISMAR-Adjunct), 2016 IEEE International Symposium, pp. 310-317.
Yem, Vibol, et al., "FinGAR: combination of electrical and mechanical stimulation for high-fidelity tactile presentation," In ACM SIGGRAPH 2016 Emerging Technologies, p. 7.
Zenner, André, "Investigating weight distribution in virtual reality proxy interaction," Universität des Saarlandes, Masterarbeit (2016), pp. 1312-1321.
Zenner, André, et al., "Shifty: A Weight-Shifting Dynamic Passive Haptic Proxy to Enhance Object Perception in Virtual Reality," IEEE Transactions on Visualization and Computer Graphics 23, 4 (2017), pp. 1285-1294.
Zhang, Fengquan, et al., "A SPH-based method for interactive fluids simulation on the multi-GPU" (2011), In Proceedings of the 10th international conference on virtual reality continuum and its applications in industry, ACM, pp. 423-426.
Zhang, Jiachao, et al., "A real-time GPU-based coupled fluid-structure simulation with haptic interaction," In 2016 EEE/ACIS 15th International Conference on Computer and Information Science (ICIS), pp. 1-6.
Zhou, MA, et al., "RML gloveâ˜A˜ TAn exoskeleton glove mechanism with haptics feedback," IEEE/ASME Transactions an Mechatronics 20, 2 (2015), p. 641-652.

\* cited by examiner

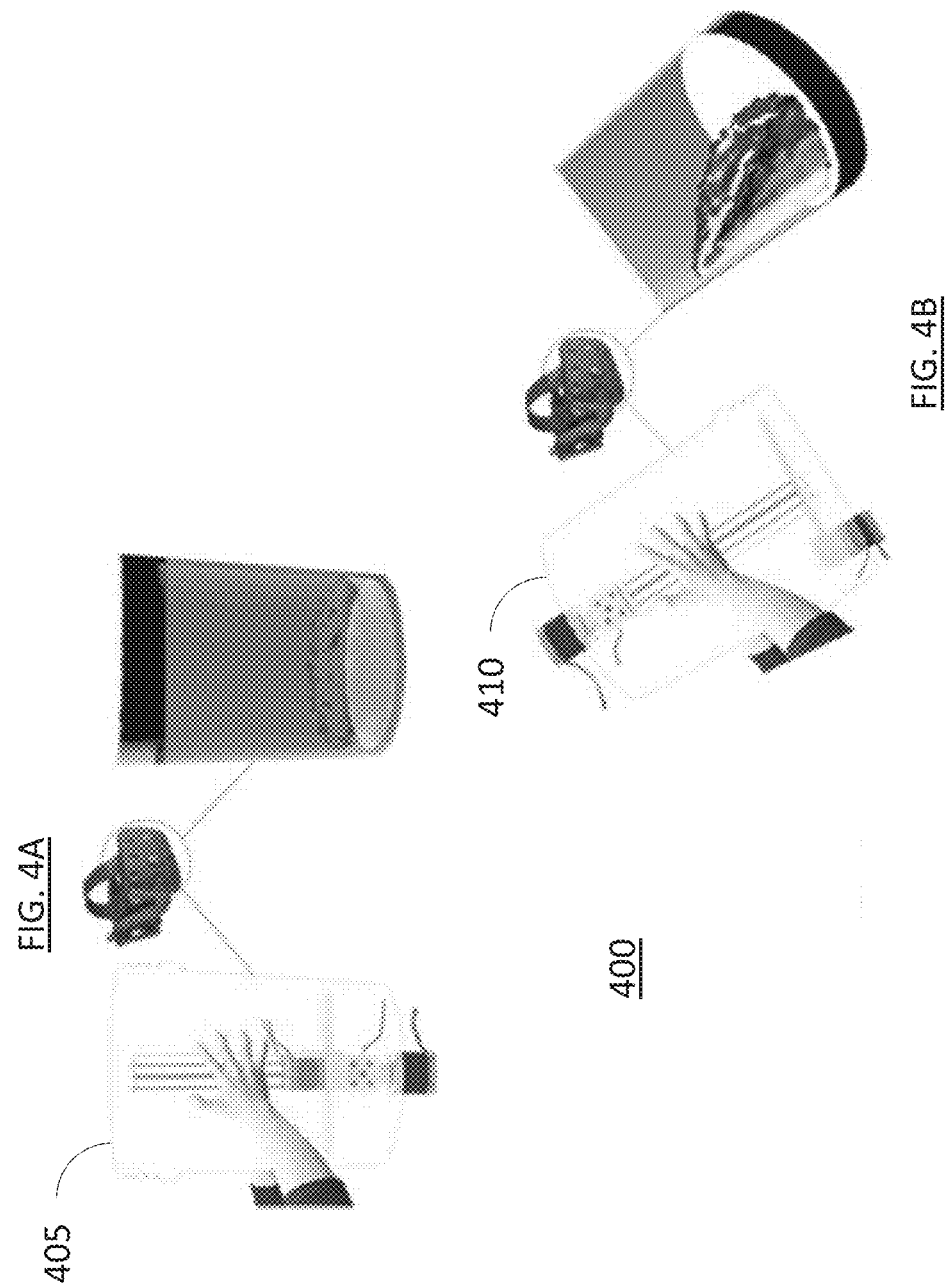

| Relationship to VRUSE | Statement | Mean ±SD |
|---|---|---|
| Q. 8 | SWISH tactile system was intuitive to use for tasks of this study | 4.38 ±0.58 |
| Q. 9 | I would have preferred an alternative tactile device | 2.58 ±0.72 |
| Q. 10 | SWISH tactile system's response to my input was acceptable | 4.21 ±0.78 |
| Q. 11 | I found SWISH tactile system to be too sensitive to use | 2.42 ±0.78 |
| Q. 19 | Visual feedback that I could see through the headset was adequate | 4.00 ±0.78 |
| Q. 20 | Overall I would rate the SWISH tactile system as a suitable VR input device | 4.17 ±0.76 |
| N/A (Short Answer) | What is your overall impression of the SWISH tactile system. For instance, does it match what you visually expect from interacting with the virtual fluid? | |
| N/A (Short Answer) | What were the strengths of the SWISH tactile system? | |
| N/A (Short Answer) | What were the shortcomings of the SWISH tactile system? | |

FIG. 11

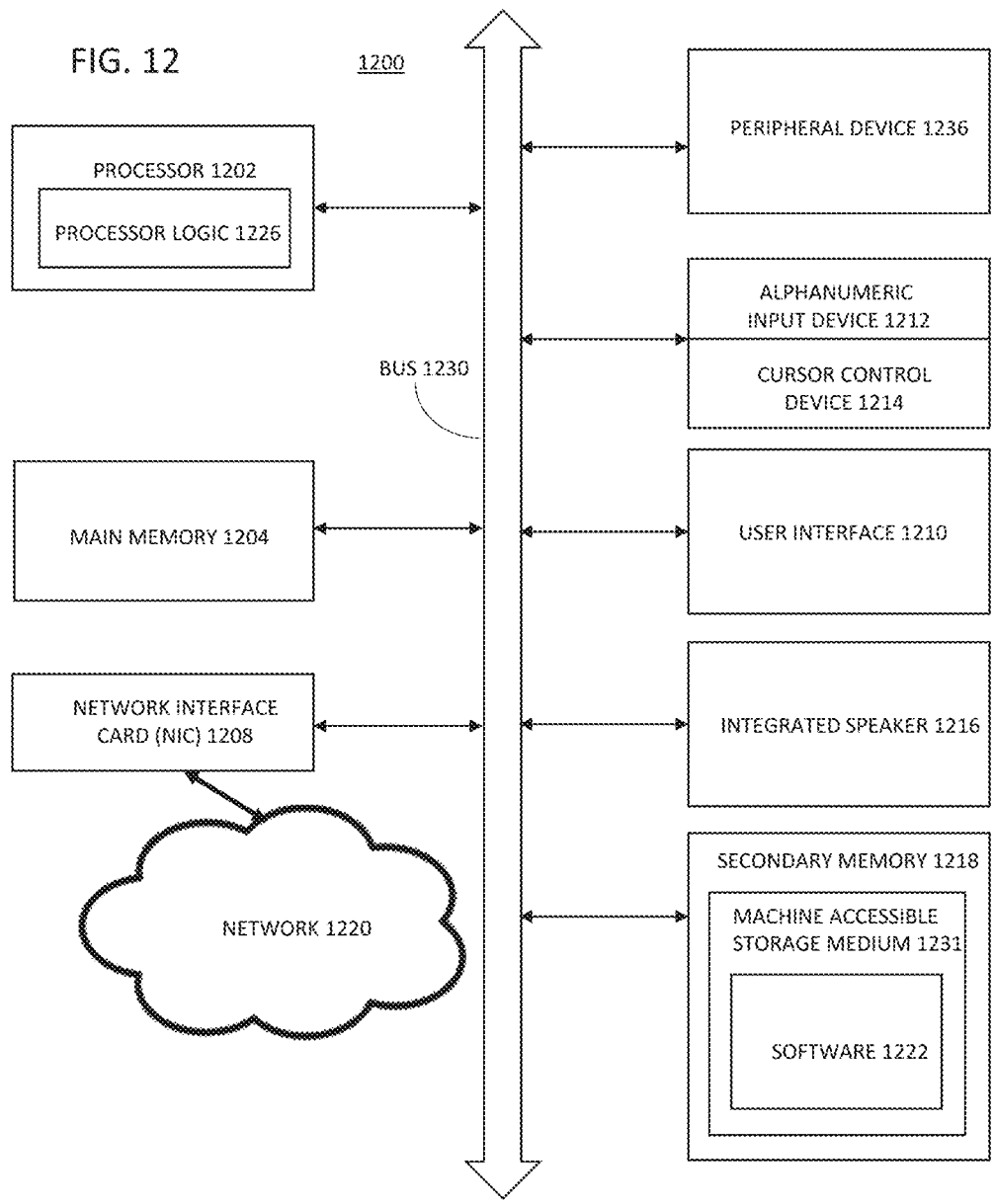

```
START
  ↓
SIMULATE FLUID CONTAINED IN VIRTUAL
VESSEL BASED ON TRACKED POSITION OF
VIRTUAL VESSEL
1305
  ↓
CALCULATE COORDINATES OF CoG
FOR SIMULATED FLUID BASED ON
TRACKEDPOSITION OF VIRTUAL VESSEL
1310
  ↓
TRANSLATE CALCULATED COORDINATES
OFCoG FOR SIMULATED FLUID INTO
CYLINDRICAL COORDINATES TO WHICH
TO MOVESOLID OBJECT IN PHYSICAL VESSEL
1315
  ↓
TRANSMIT INSTRUCTIONS TO MECHANICAL MEANS
TO MOVE SOLID OBJECT IN PHYSICAL VESSEL
BASED ON CYLINDRICAL COORDINATES TO SHIFT
WEIGHT OF PHYSICAL VESSEL IN ACCORDANCE
WITH CoG OF SIMULATED
FLUID IN VIRTUAL VESSEL
1320
  ↓
END
```

METHOD AND APPARATUS FOR SIMULATED HYDRODYNAMICS IN MIXED-REALITY FLUID VESSELS

CROSS-REFERENCE TO RELATED APPLICATIONS

This nonprovisional patent application claims priority to provisional patent application, No. 62/769,798, filed Nov. 20, 2018, entitled "Shifting-Weight-based Interface for Simulated Hydrodynamics in Mixed Reality Fluid Vessel (SWISH)", the contents of which are incorporated herein by reference.

TECHNICAL FIELD

The invention relates to a haptic feedback device capable of simulating movement of a fluid in a virtual reality or augmented reality system. The device is mechanically actuated to tangibly represent a shift in the center of gravity of a virtual reality fluid in a physical vessel.

BACKGROUND

Mixed-reality systems involve virtual reality and physical environments in which physical objects are used to create interactions with programmable media for various applications. Such applications include:

Educational Training. A mobile augmented reality environment is a basic building block of education and workforce training to improve spatial abilities of a user and with a clear focus on the digital aspect of virtuality for augmentation.

Fluid Dynamics. Researchers have devised solutions for simulating fluids in virtual environments. For example, Eulerian grid-based solutions to the Navier-Stokes equation (describing the physics of fluids in motion in response to the different forces acting on them via the surrounding medium) were extended to simulate stable models of complex fluid-like motion, leading to generalized models for simulating liquids. Lagrangian-based techniques were popularized in Smooth Particle Hydrodynamics (SPH) for modeling deformable solids and are now used for simulating fluids containing millions of particles. Prior art engines perform realistic simulation of computational fluids through Graphics Processor Unit (GPU) accelerated frameworks, such as Nvidia's PhysX System Software, FleX, and Flow.

Haptics for physical feedback. Prior art haptic systems create sensations related to mass, force, and texture of virtual objects. Such examples include Gravity Grabber, a wearable haptic display to present the weight sensation of a virtual object, which is based on the insight that the deformation on fingerpads makes a reliable weight sensation even when proprioceptive sensation is absent, FinGAR, which delivers glove-based electrical and mechanical stimulation for tactile feedback, TorqueBAR and Shifty, which vary the internal weight distribution to alter user's perception of the virtual objects. Haptic feedback mechanisms that use mechanical torque cues, texture simulation and force, or the change in weight and volume of an object have been proposed. Some use of tethered devices has been considered to present the nuances of fluid dynamics.

What is needed is a way to utilize fluid simulation frameworks to drive the haptic actuation of virtual fluid movement within a physical vessel.

BRIEF DESCRIPTION OF THE DRAWINGS

Embodiments are illustrated by way of example, and not by way of limitation, and will be more fully understood with reference to the following detailed description when considered in connection with the figures in which:

FIGS. 4A and 4B illustrate location of mechanical modules at two states, according embodiments of the invention.

FIG. 11 is a table of questionnaire statements and their relationship to a computerized diagnostic tool for usability evaluation of virtual/synthetic environment systems in accordance with a user study of embodiments of the invention.

FIG. 12 illustrates a diagrammatic representation of a machine 1200 in the exemplary form of a computer system, in accordance with one embodiment, within which a set of instructions, for causing the machine 1200 to perform any one or more of the methodologies discussed herein, may be executed.

FIG. 13 is a flowchart in accordance with embodiments of the invention.

SUMMARY

Figure 1:
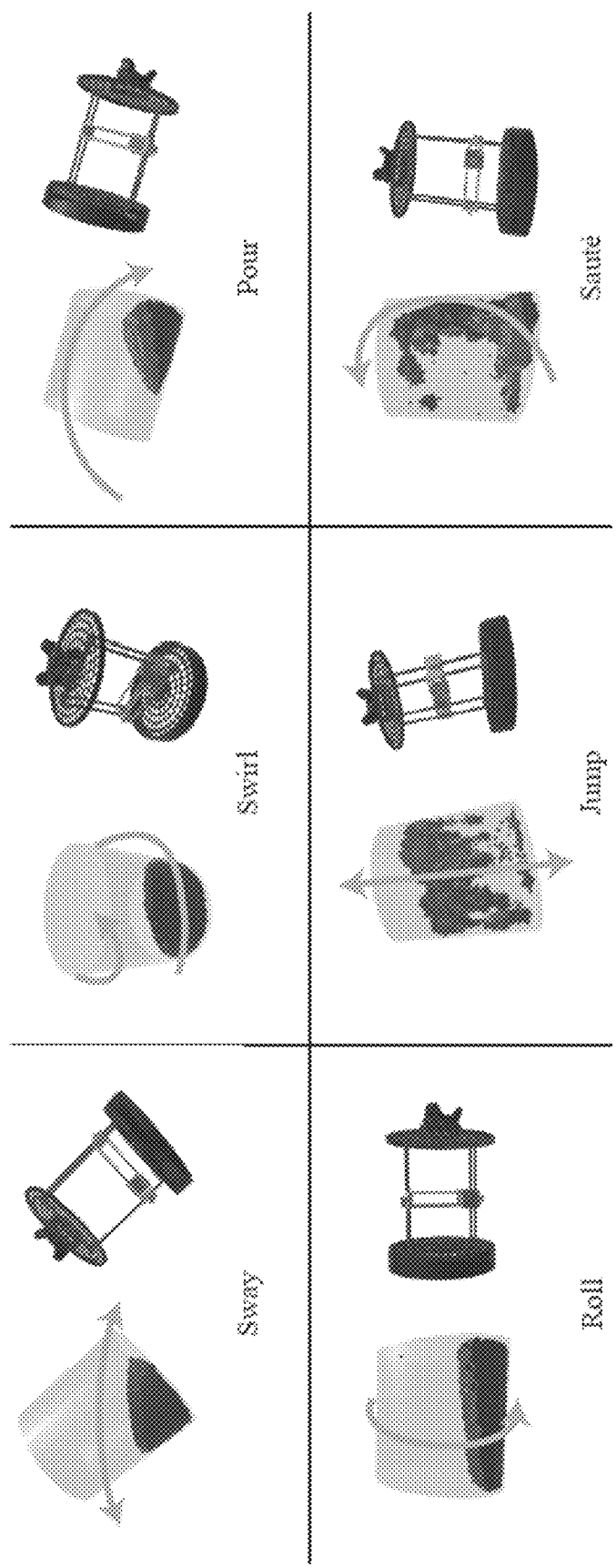
FIG. 1 depicts six different actions for interacting with an embodiment of the invention.

Embodiments of the invention include a physical vessel containing a solid object and mechanical means to move the solid object therein. A virtual reality module tracks a position of the physical vessel and a corresponding virtual vessel. Logic simulates a fluid contained in the virtual vessel based on the tracked position of the virtual vessel. Further logic calculates coordinates of a center of gravity for the simulated fluid based on the tracked position of the virtual vessel. Additional logic translates the calculated coordinates of the center of gravity for the simulated fluid into cylindrical coordinates to which to move the solid object in the physical vessel. Finally, logic send instructions to the mechanical means to move the solid object in the physical vessel based on the cylindrical coordinates to shift the weight of the physical vessel in accordance with the center of gravity of the simulated fluid in the virtual vessel.

DETAILED DESCRIPTION

Prior art mixed-reality systems are unable to reproduce a physical sensation in fluid vessels that, in the case of an individual handling an actual fluid vessel or container, is caused by shifting of a virtual fluid in the actual fluid vessel. In other words, the emulation of this specific aspect of the fluid motion has not been realized. To address this deficiency, embodiments of the invention provide a type of ungrounded (e.g., handheld, or not fixed in place) mixed-reality system, which provides users a realistic haptic sensation of virtual fluid behaviors in a physical vessel. The embodiments place an emphasis on reproducibility, scalability, and availability of this tangible sensation. Embodiments of the invention further provide solutions to challenges of designing ungrounded haptic devices, capable of rendering fluid behaviors, as presented herein, especially to coordinate translating and creating virtual adaptations to physical limitations.

Embodiments of the invention provide a virtual-to-physical coupling of the integration of a particle-based simulation technique for real-time visual effects in an augmented reality (AR), mixed reality (MR), or virtual reality (VR) platform with an augmented physical vessel containing a motorized mechanical actuation system. For example, embodiments of the invention provide a virtual-to-physical coupling of the Unreal Engine (available from Epic Games) integrated with Nvidia's Flex platform to an augmented physical vessel comprising a motorized mechanical actuation system.

To evaluate the effectiveness and perceptual efficacy of embodiments of the invention, a user study with 24 participants was conducted. The results reveal that the embodiments perform better than incongruent passive proxies in both cases and perform similar to congruent passive proxies, as further discussed below.

Mixed-reality systems combine virtual reality and physical environments and objects to create embodied (physical) interactions with programmable media. Notably, while commercial works and academic research have enabled rich visual integration of digital and physical objects, tangible integration has largely been focused on simulating the sensations of interacting with rigid objects using vibrotactile, exoskeletons gloves, robotic arms, passive proxies, and grounded devices, with a few instances of ungrounded systems.

In contrast to conventional approaches, embodiments of the invention stem from the realization that transformative opportunities for fluid-based mixed-reality experiences where users handle physical vessels that contain augmented virtual fluid in augmented reality or virtual reality enable a variety of use cases, including, for example: workforce training simulations for handling of hazardous liquids; experimentation modules for physics, chemistry, and biology labs; or fluid transfer interactions for a sophisticated user interface. Fluid-based haptic devices for Mixed-Reality (MR) can enrich user experiences even further and provide broader affordances.

Handling mixed-reality vessels in AR and VR requires physically faithful representations of virtual fluid dynamics in a physical vessel. As fluid takes the shape of its vessel, the weight distribution of the fluid changes with the orientation and movement of the vessel, relocating the center-of-gravity (CoG) of the fluid within the vessel. Therefore, to mimic tangible physical interaction with virtual fluid-based materials, the physical vessel system should also account for the fluid dynamics of the shifting weight, and correspondingly shift the weight of the physical vessel. To this end, embodiments of the invention simulate the shifting CoG of virtual fluids for use in mixed-reality fluid vessels in AR/VR.

Natural liquids exist abundantly; people interact with various types of liquids on a daily basis. During everyday interactions, people perform multiple tests to evaluate various characteristics of liquid vessels, such as shaking and tilting the vessels, and other fluid interactions, such as swaying, swirling, pouring, rolling, jumping and sautéing as shown in FIG. 1. For instance, one might gently sway a cooking pot to evaluate whether or how much water is in it. Thus, realistic haptic feedback is important for simulation of fluid dynamics in a vessel. Realistic haptic simulation of fluid interaction creates and enhances several practical aspects of MR systems, including pouring, swirling, or otherwise handling fluids, to provide the user with more accurate tangible perception of the interaction with the virtual fluids such as to cause the user to perceive them as real. Realistic haptic feedback is especially important for simulation-based training and evaluation of fluid-handling practices, as the training needs to reflect real experiences for successful skill acquisition. While humans are familiar with the qualities of household liquids, such as water and cooking oil, users can perform multiple tests to identify, understand and categorize other types of liquids. Successful fluid haptic simulation according to embodiments of the invention yield a new class of affordances for fluid-based media.

The new affordances of mixed reality fluid handling unlocks a wide variety of practical mixed-reality scenarios, such as:

The mixed-reality fluid systems lend themselves for training/evaluation situations involving hazardous fluids. For example, to limit untrained exposure to harmful chemicals, embodiments of the augmented fluid technology described herein allow workers to interact with augmented fluid in a vessel that simulates fluid properties of hazardous materials, e.g., color, viscosity, chemical reactivity; and for employers—to observe and track fluid handling tasks for continuous worker evaluation, e.g., tracking safe practices, efficient material use, and worker proficiency. Using augmented fluids in dangerous or hazardous situations comes with the added advantage of avoiding disastrous consequences if a mistake is made during skill training.

Embodiments of the mixed-reality fluid systems described herein enable workers to pursue open exploratory experimentation with fluid handling. Indeed, most fluid combinations are not separable once mixed, and many combinations initiate a corresponding chemical reaction with limited time left for the user to process and use the results. (For example, mixing silicone rubber or epoxy requires a homogeneous polymer mixture, but there is a limited time for application of these costly materials.) Timing is important; there is a significant risk of product failure if these materials are applied too early or too late. Using embodiments of the invention, users can rehearse a variety of processes to identify optimal physical layouts, tools, vessels, and gain kinesthetic skill and experience of specific fluid-based activities without material waste.

The embodiments of mixed-reality fluid systems also enable workers to travel with portable remote laboratories, thereby carrying out the augmented testing from many locations, such as class rooms, homes and hotel rooms. Complete with the ability to interact with virtual fluids through physical vessel interactions, e.g., swirling and pouring, workers can rapidly interact with simulated fluid experiments. For such interaction, it is helpful for the augmented system to replicate visual-tactile interactions to represent experimental conditions.

Moreover, workers can utilize the embodiments for immersive visualization of additional layers of information. For example, through the AR or VR headset, the worker can view temperature gradients, density, turbulent flow, laminar flow, or other fluid properties spatially overlaid onto/into the virtual fluid. With overlays of transparent colors, workers can see catalyzed reactions. The augmented vessels provide workers with rich real-time agency over view and manipulation of the phenomena.

Embodiments of the invention address two challenges: (i) actuating the center-of-gravity (CoG) shifts of a virtual fluid in a physical vessel with the use of a motorized apparatus, and (ii) coupling virtual fluid simulation with physical actuation of the physical vessel. Embodiments of the invention may be scaled for broad populations through accessible software frameworks and prototype-able hardware mechanisms.

As described in more detail that follows, in general, embodiments of the invention include a physical vessel that contains a solid object and mechanical means to move the solid object therein. A virtual reality module tracks the position of the physical vessel and a corresponding virtual vessel. With reference to the flowchart 1300 in FIG. 13, logic 1305 simulates a fluid contained in the virtual vessel based on the tracked position of the virtual vessel, and logic 1310 calculates coordinates of a center of gravity for the simulated fluid based on the tracked position of the virtual vessel. Next, logic 1315 translates the calculated coordinates of the center of gravity for the simulated fluid into cylindrical coordinates to which to move the solid object in the physical vessel. Logic 1320 then send instructions to the mechanical means to move the solid object in the physical vessel based on the cylindrical coordinates to shift the weight of the physical vessel in accordance with the center of gravity of the simulated fluid in the virtual vessel.

Embodiments further include logic to generate the instructions to send to the mechanical means to move the solid object in the physical vessel based on the cylindrical coordinates, as well as logic to modify the instructions based on limitations of the mechanical means. The logic to modify the instructions based on limitations of the mechanical means includes logic to modify the instructions based on one or more of a maximum speed, direction, and distance, of the mechanical means to move the solid object, and/or based on a periodicity of the instructions.

As discussed further below, the mechanical means includes at least three motors coupled to an adjustable mechanical structure. The solid object is fixed to the adjustable mechanical structure, and logic transmits instructions to the motors to adjust the mechanical structure and thereby move the solid object fixed thereto based on the cylindrical coordinates. The logic to send instructions to the motors to adjust the mechanical structure and thereby move the solid object fixed thereto based on the cylindrical coordinates, according to one embodiment, includes proportional-integral-derivative logic.

Figure 2:
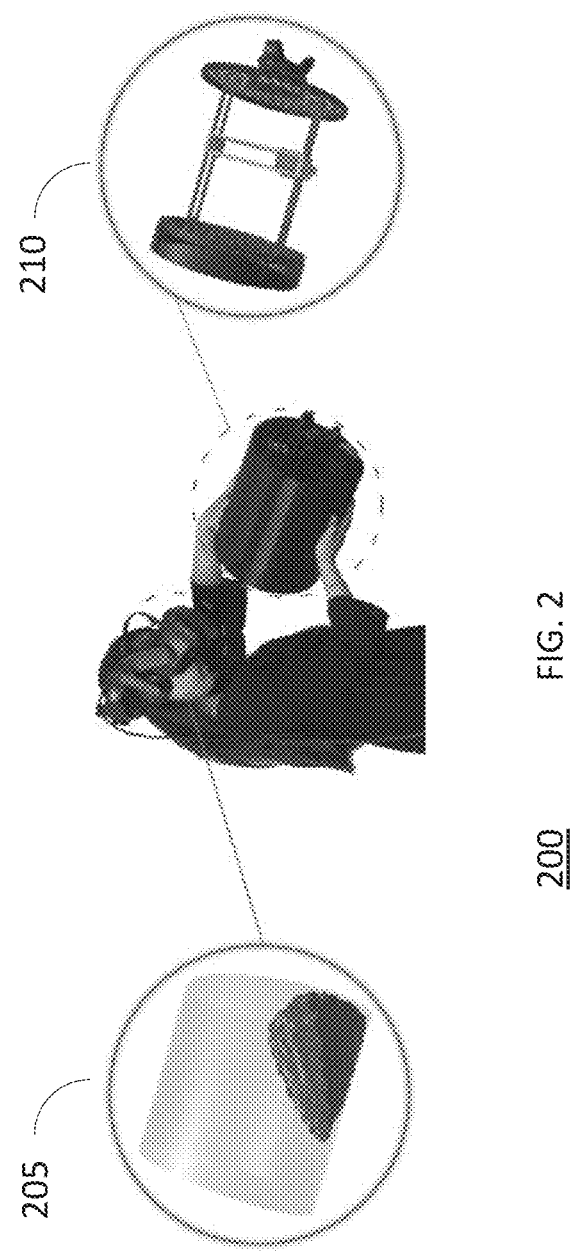
FIG. 2 depicts fluid dynamics for virtual simulations, and a mechanically actuated system that tangibly represents a fluid's center of gravity, according to embodiments of the invention.

In general, and in reference to FIG. 2, embodiments of the invention 200 encompass a set of mechanisms that physically represent the center of gravity (CoG) of a virtual vessel of fluid. The virtual fluid is simulated and visually rendered through VR or AR devices, while a corresponding physical vessel houses mechanical motors to dynamically actuate feelings of shifting of the simulated fluid as changes occur in the orientation of the corresponding physical vessel. According to the embodiment 200 depicted in FIG. 2, a simulated, virtual, fluid in a virtual vessel is depicted at 205, for example, rendered through a VR or AR headset worn by a worker, and a representation of the corresponding position of the mechanically actuated physical vessel is depicted at 210.

Embodiments of the invention solve a problem of providing a user with a feeling that a virtual fluid mass in a vessel or container (e.g., a bucket) that the user holds has shifted as a result of an applied influence—as appropriate to virtual fluid movement. While in motion, a solid object holds its shape. As such, the displacement or movement of the center of gravity (CoG) stays faithful to the pattern that the object is following. However, fluid particles change their position while moving, which results in a shift in the position of the CoG of the fluid. The shape of the vessel, the motion of the vessel, and a fluid's viscosity all contribute to the pattern that the CoG of a fluid follows within the vessel. In an embodiment of the invention, a combination of motors form a cylindrical motor arrangement that is used to shift the weight of the vessel to simulate a shift in the position of the CoG of a virtual fluid in the vessel, taking into consideration at least the shape of the vessel, the motion of the vessel, and the virtual fluid's viscosity.

Embodiments of the invention provide for fluid center-of-gravity patterns through cylindrical coordinates. The discrete nature of fluid particles permits a wide variety of positions in space within the limits of physical constraints of a vessel. However, the average sum of all these positions collapses to a manageable center of gravity (CoG) point with finite range. Accurate physical simulation of this pattern is possible, in accordance with embodiments of the invention, with controllable (i.e., moveable) rigid, or solid, objects in a system capable of moving the objects to distribute the overall mass of the objects to achieve this same CoG. The achievable CoG range possible for such a system depends on the ratio and range of the masses of the objects, as well as their locations.

A mechanical system for shifting the CoG of a virtual fluid in a physical vessel involves at least three degrees of freedom to reposition the objects. Due to the rotational symmetry of a cylindrical vessel and proper cohesion of the fluid particles, the CoG follows roughly concentric elliptical curves with motion patterns of swirling, swishing, and tilting. In the present context, the motion of swirling is understood as fluid movement around or along with a whirling motion that creates a whirl, or eddy, while the swishing motion is that resulting in or producing wave-like repositioning of fluid.

In consideration of the continuity of the curve-like path of a virtual fluid in a cylindrical vessel, embodiments of the invention use a cylindrical coordinate system for positioning the one or more objects in the physical vessel to physically shift the weight of the vessel to simulate a corresponding shift in the CoG of a virtual fluid in the vessel. Computationally motorized systems use discretized motor commands to actuate movement, according to one embodiment.

Figure 3:
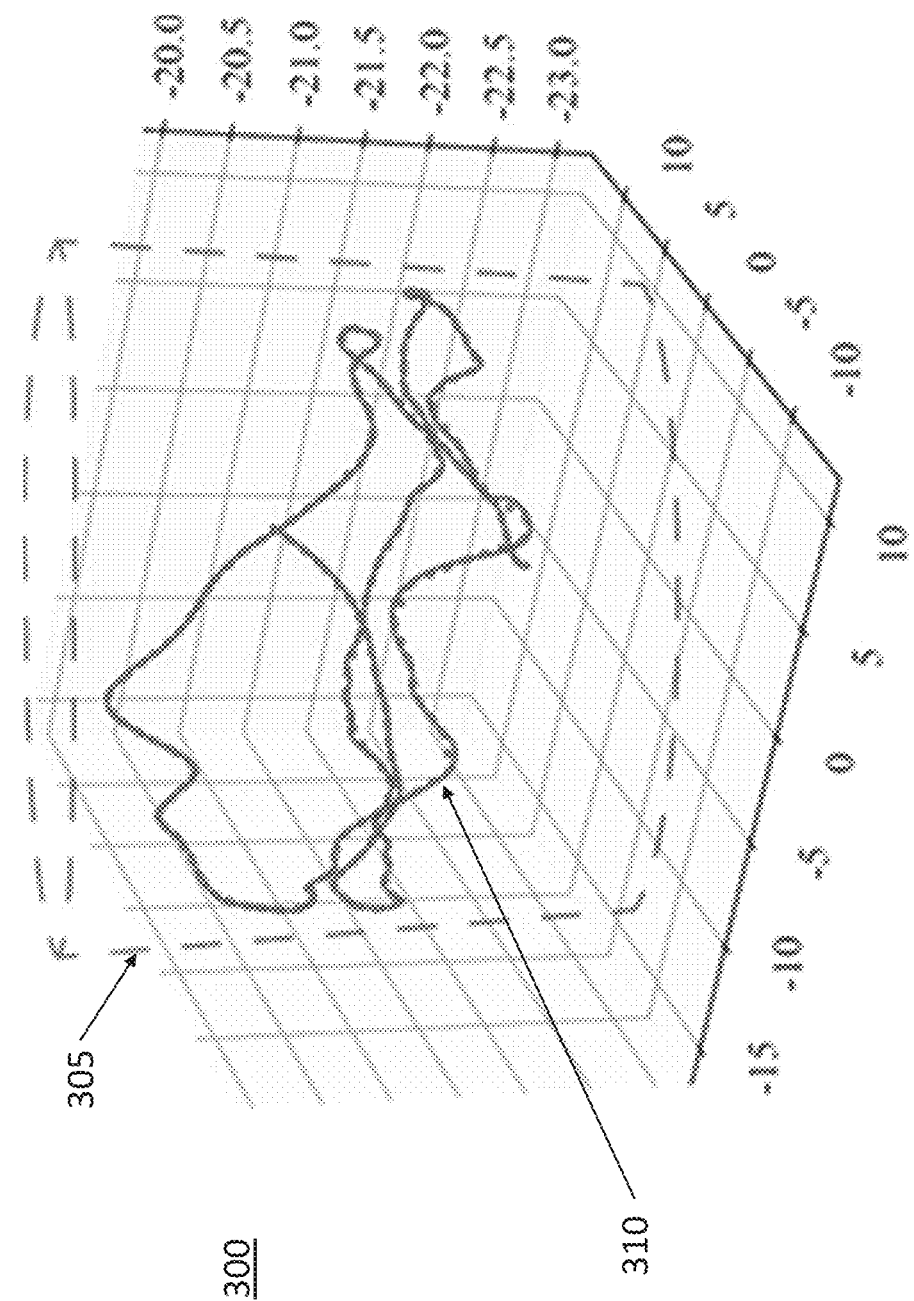
FIG. 3 provides a three-dimensional graphic of the discretized cylindrical motor path (dotted line) that substantially follows the simulated fluid path (solid line), according to an embodiment.

FIG. 3 is a three-dimensional graphic 300 of the discretized cylindrical motor path (dotted line 305) that substantially follows the simulated fluid path (solid line 310), according to an embodiment. The cylindrical discretization of the motion of the fluid can closely follow the curves of the fluid CoG patterns, reducing path error and creating a smoother feeling for the user, according to an embodiment.

Motorized relocation of center-of-gravity, according to an embodiment of the invention, is described below. Specifying the cylindrical position of the CoG of the vessel, the mechanically-actuated system contemplates a movement of the solid objects in three coordinates: radial distance (r), azimuth (φ) and height (h). Achieving a symmetric set of mechanisms involves two types of linear actuation mounted on radial, distance, and height motors. To actuate radial distance of the CoG, a rack-and-pinion system is used to transition one or more motors as a mass module along the radius. To change the height of the CoG, a lead screw and nut mechanism is used to raise and lower the radial shifting mechanism. Attaching the motors, lead screw and nut mechanism directly to a rotating motor enables the system to achieve the azimuth (φ) of the movement of the CoG.

Implementation of mechanical actuation, according to one embodiment 400, is described below with reference to FIGS. 4A and 4B. The motors are stepper motors, according to this embodiment, and the electronic components are off-the-shelf, available at stores. The parts were designed with industry standard CAD tools and may be printed using 3D printers with ABS material. Assembly tools, including fasteners, smaller metallic parts, and the container vessel are available at any hardware store.

Radial stepper motors provide accurate continuous rotation at high speeds. Thus, one embodiment implements the radial shifting mechanism using two NEMA 17 (1.8° per step, torque=3.2 k·cm) stepper motors running at 24V. These two motors are equally spaced along the vertical axis to maintain the balance at zero state and move concurrently. A metal 5 mm diameter flange shaft coupling connects the shaft of the stepper motor to a spur gear designed in SolidWorks with the following parameters: number of teeth=30, pitch diameter=25 mm diametrical pitch=1.21/mm which results in 0.3925 mm distance of travel per step. All gears may be 3D printed, for example, with a Stratasys uPrint SE 3D printer. A 3D printed enclosure holds this assembly within the proper range of contact angle to the 3D printed rack. The total length of the rack is 168 mm. The radial shifting mechanism is connected with a nut to the lead screw of the height stepper motor.

Constraining the torques around the lead screw involves additional support. Thus, there are two 3/16" diameter stainless steel rods on either side of the lead screw, secured from the top and bottom using push nuts. A 3D printed column printed using Stratasys Dimension 1200es secures this assembly to the mounting plate of a NEMA 17 hybrid elevation, vertical, or height stepper motor. A Tr8×8 (pitch 2 mm, length=280 mm) lead screw attached to the hybrid stepper motor enables the radial shifting mechanism to move vertically 0.04 mm per step. The hybrid stepper motor is connected to the same 24V power supply as the radial ones.

The radial and height assembly are connected directly to a NEMA 23 (1.8° per step, torque=1.2N·m) azimuth stepper motor using a 3D printed flange coupling secured at the bottom of the height motor using M3 screws. The NEMA 23 stepper mounts directly to the bottom of the bucket and rotates the entire actuated assembly. This motor is connected to the same 24V power supply as well. Radial and height motor wires are connected to a slip ring to prevent any twist that might cause disconnect.

An Arduino Mega 2560 microcontroller receives signals, for example, from an Unreal Engine via a Bluetooth modem, and sends step/direction signals to motor controllers. Concurrent movements of all motors is calculated, for example, using AccelStepper library's MultiStepper class. All motors operate at full step mode for increased torque.

In this embodiment, the individual stepper motors, and corresponding framework, each have a mass that may, by itself, be sufficient for purposes of simulating a shift in the CoG of a virtual fluid in the physical fluid vessel. That is, one or more of the motors themselves may suffice as the solid objects to be moved around within the physical vessel to approximate a shift in the CoG of a virtual fluid in the physical vessel. Alternatively, a solid object of sufficient mass may be collocated with one or more of the motors to provide the necessary mass in combination with the motor in order to achieve shifting of a virtual fluid's CoG with a needed finite range for the simulation. Alternatively, a single solid object of sufficient mass is moved around the vessel in order to achieve shifting of a virtual fluid's CoG with a needed finite range for the simulation.

FIGS. 4A and 4B depict the location of a mechanical module (i.e., physical vessel including a movable solid object) in two different states, according to an embodiment. In FIG. 4A, the mechanical module is in resting state 405: wherein CoG is at a minimum position, and coordinates of this location are r=0, φ=0, h=90 mm. In FIG. 4B, the mechanical module is in tilted state 410: wherein CoG is at the maximum position, and the coordinates of this location are r=24 mm, φ=0, h=167 mm. With the reference point located at the center of the bottom of the vessel (in this embodiment, a cylindrical shaped bucket), the achievable range of CoG of embodiments of the invention is approximately 24 mm radially and approximately 167 mm vertically. In one embodiment, the mechanical elements of the system are enclosed inside a 5 gallon opaque bucket. A custom-made bracket holds the lid of the bucket at a distance to provide heat dissipation. An HTC Vive virtual reality controller is directly attached to the bracket for virtual reality tracking. The total weight of this embodiment including the bucket is approximately 3700 g.

Figure 5B:
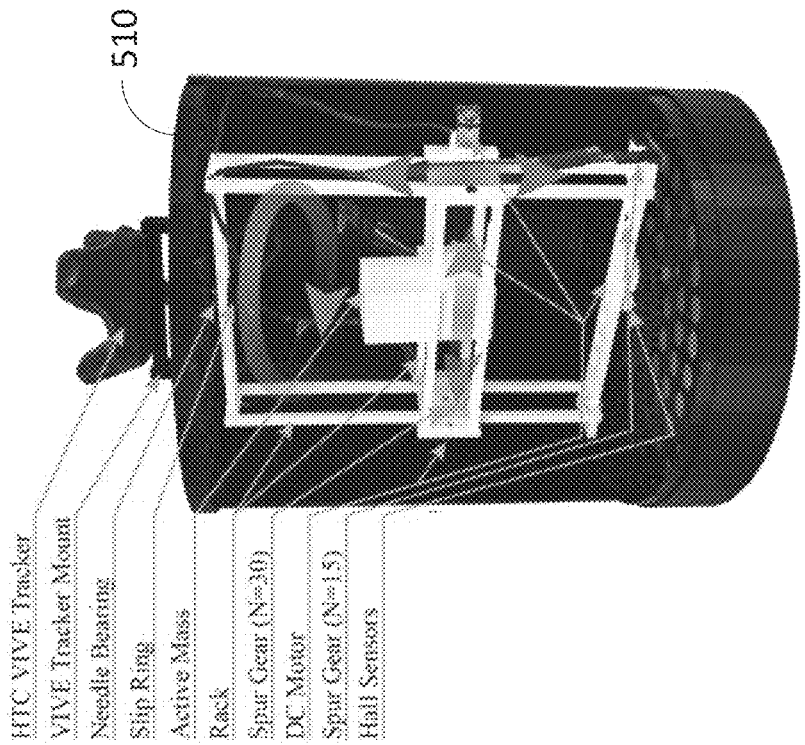
FIGS. 5A and 5B depict a mechanical structure and actuation mechanism in accordance with an embodiment of the invention.
Figure 5A:
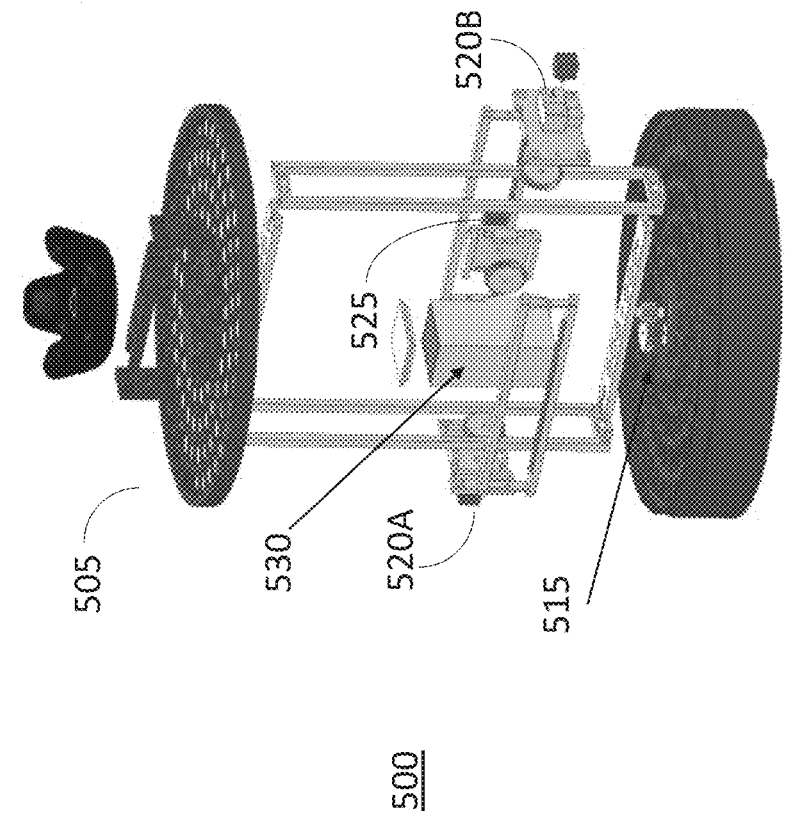

Implementation of mechanical actuation of movement of a solid object within the physical vessel, according to another embodiment 500, is described below with reference to FIGS. 5A and 5B. The mechanical system according to this embodiment 500 has an internal motorized structure 505 inside of an external stationary housing 510 of the vessel.

The rotational symmetry of the cylindrical coordinate system aligns with typical cylindrical vessel shapes. As such, it is appropriate to provide structural support for each of the three cylindrical axes. Embodiments use a rack-and-pinion mechanism based on gantry system actuation that sits inside of a cylindrical volume within a vessel. A motor 515 at the base of the central axis controls azimuthal (φ) changes to the CoG. A pair of height or elevation motors 520A and 520B coupled to arms aligned with and offset from the central axis controls the height (h). Finally, a motor 525 along a radial arm relocates a weighted mass 530 to control the radius (r) of the CoG. In one embodiment, the weight of mass 530 can be adjusted to approximate the mass of a fluid corresponding to the virtual fluid being simulated. In one embodiment, the combined weight of the mechanical framework and motors is taken into consideration in selecting or adjusting the weight of mass 530.

A component of authentic simulation of shifting CoG of a fluid in the vessel is reliable path following of the corresponding mass 530. To this end, with reference to the functional block diagram of embodiment 601 provided in FIG. 6B, embodiments implement a proportional-integral-derivative (PID) control loop feedback logic to precisely control positions of motors 520A, 520B, and 525. The microcontroller adjusts a pulse width modulation (PWM) signal at 632 and sends at step 635 step commands to the motor drivers, for example, at a rate of 100 commands per second. PID coefficients are calculated at step 631 using an empirical step response to setpoint method, while the entire apparatus is grounded, e.g., while the entire apparatus rests on a desk. During calculation, the active mass is mounted on the actuation system to account for load disturbance.

According to this embodiment, components may be 3D printed with a Strata-sys Dimension 1200es (FDM technology) 3D printer, using ABS material. Stationary housing 510 surrounds the entire cylindrical mechanism, with diameter 248 mm and height 262 mm, according to one embodiment. The active mass 530 moved by the actuation mechanism weighs 561 g, and the entire vessel weighs 1477 g, according to this embodiment.

For faithful and accurate coupling of virtual reality fluid dynamics and physical actuation of those dynamics in a tangible vessel, the virtual simulation, in accordance with embodiments of the invention, accounts for physical direction, distance, and speed capabilities of the tangible vessel motors. This involves shared virtual-physical unit(s) of measurement and physically-based constraints on the virtual movement commands. Hence, the virtual environment is designed to provide appropriate motor commands, built from accurate fluid simulation computations. The use of virtual-to-physical coordinate translation and efficient movement decision-making prioritizes attainability and responsiveness.

Figure 6A:
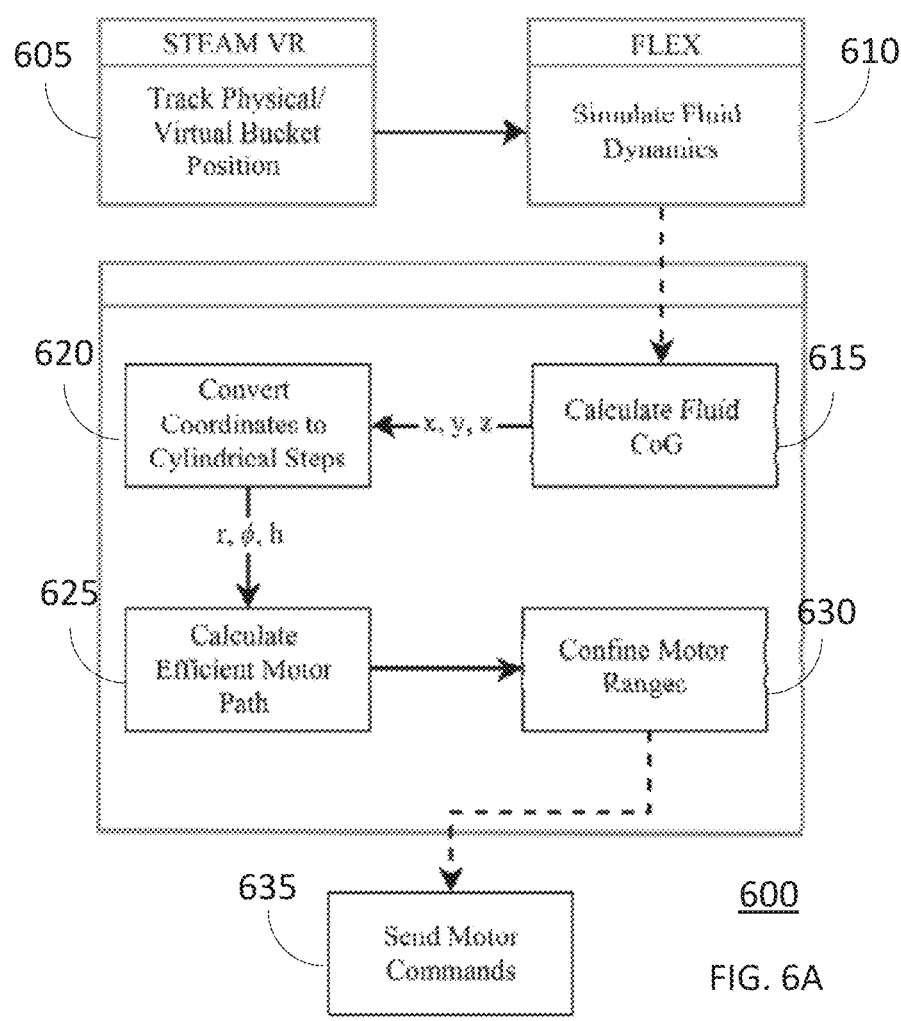
FIGS. 6A and 6B provide functional block diagrams of embodiments of the invention.
Figure 6B:
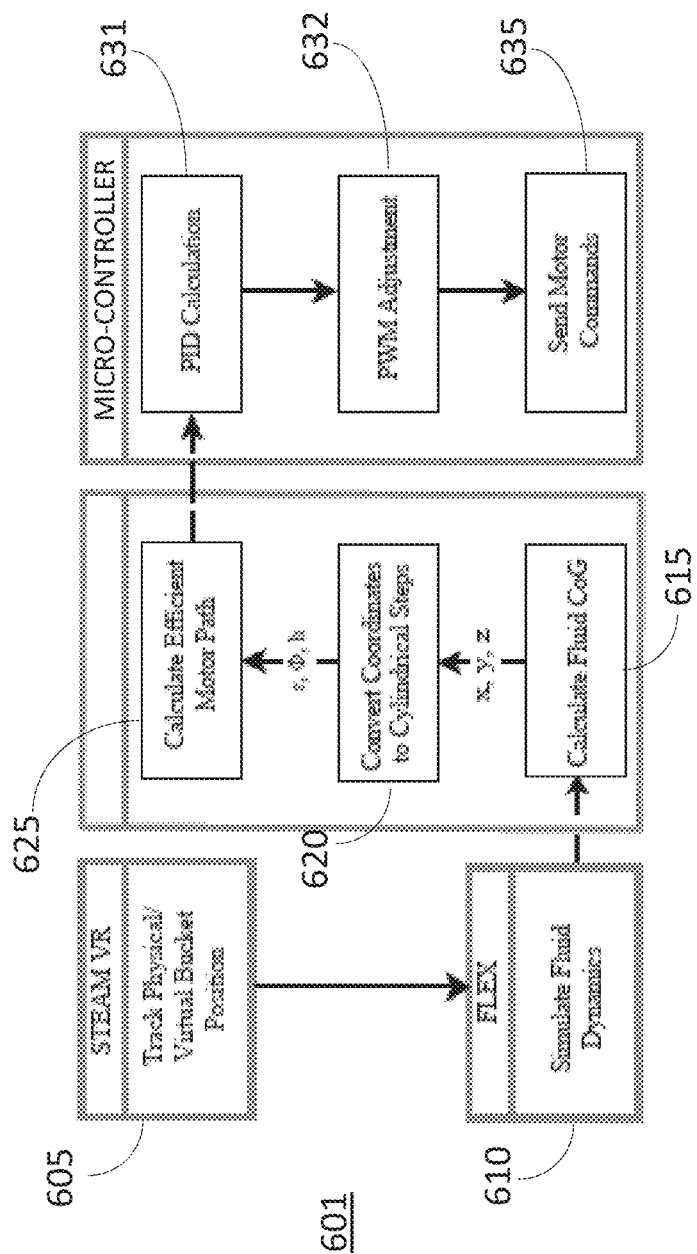

Regarding virtual-to-physical coordinate translation, the fluid simulation created by a computational engine uses Cartesian world-space virtual scene coordinates. Conversely, the physical vessel, or bucket, motors respond to cylindrical coordinates, as described earlier. One embodiment computes the translation between these coordinate systems using a sequence of mappings as shown in FIG. 6A. FIG. 6A is a functional block diagram 600 of an embodiment of the invention that takes motion-tracked location data 605 and converts the data into motor stepper commands 635. At 610, logic calculates the virtual scene coordinates for the virtual bucket's CoG scene with respect to its self-origin, generating therefrom a position vector. Then, the position vector is inversely rotated by logic 615 to attain the virtual bucket's local CoG in Cartesian space, with the z-axis representing cylindrical height, x and y are converted to r and φ. The polar position vectors are then linearly scaled by logic 620 to represent movement commands for stepper motor positions.

The motors have a finite achievable range of motion in a given time. Therefore, logic 630 clamps the range of values to physically attainable ranges prior to sending the coordinates. These ranges can be computed from the maximum speed of the motors multiplied by the periodicity of the motor commands.

Figures 7A, 7B:
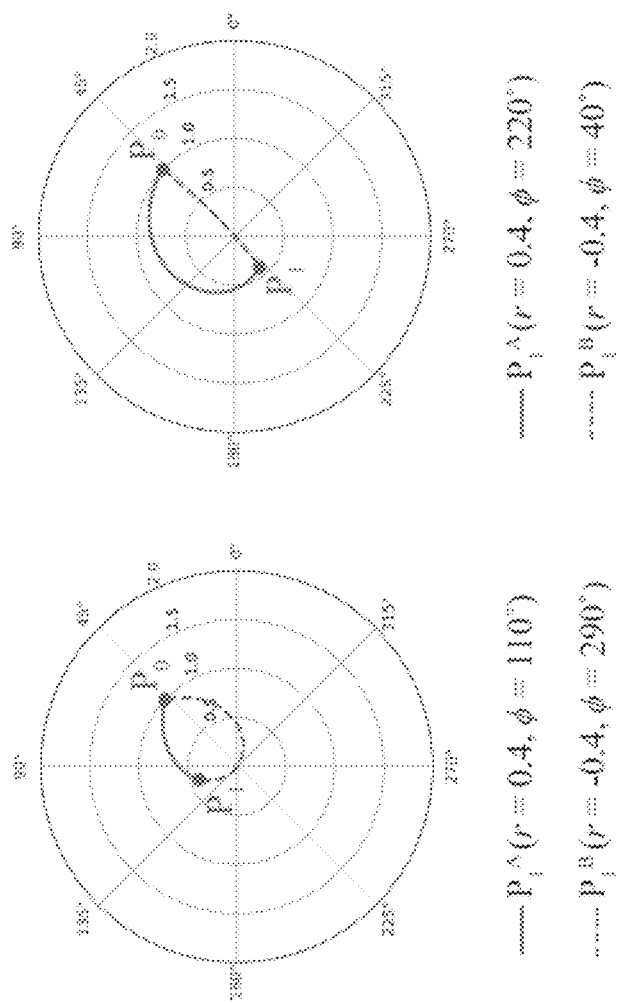
FIGS. 7A and 7B illustrate two equivalent representations for anticipated target positions for an active mass, in accordance with embodiments of the invention.

Regarding calculating efficient movement, logic 625 makes decisions to prioritize smooth, efficient, movement between motor positions. Because of the cylindrical coordinate system, each CoG position has two equivalent motor positions: (r, φ), and (r, φ+180). Between frames, it may be favorable to change the direction towards one position over the other, as depicted in FIGS. 7A and 7B. FIGS. 7A and 7B provide two equivalent (r,φ) respective representations $P_1^A$ and $P_1^B$ for anticipated target position(s), according to embodiments of the invention. Based on the start position and end position, one path may require less motor movement than the other. FIGS. 7A and 7B show potential scenarios for motor movements from P0 to P1. FIG. 7A illustrates it is favorable to move to the position with positive radius ($P_1^A$), creating less movement than the path to the position with negative radius ($P_1^B$). FIG. 7B illustrates the reverse is true: having the mass travel along the radial arm to use a negative radius position ($P_1^B$) results in less movement.

Thus, to minimize motor movement against physical constraints and provide faster actuation of the active mass, embodiments of the invention make a decision by comparing the number of radial motor steps and azimuthal motor steps to achieve either position. One embodiment prioritizes whichever position pair requires fewer steps, as shown the following algorithm for calculating efficient cylindrical movement:

```
 1: procedure MINIMUM MOTOR STEPS
 2: Vector liquidMass·GetCoG( );
 3: massHeight=-(liquidMass.z);
 4: massTheta=a tan 2(liquidMass.x, liquidMass.y);
 5: massRadius=SQRT (liquidMass.y2+liquidMass.x2)
 6: heightSteps=massHeight*HeightStepScale;
 7: phiSteps=massPhi*PhiStepScale;
 8: radiusSteps=massRadius*RadiusStepScale;
 9: deltaRadiusA=radiusSteps-prevRadiusSteps;
10: deltaPhiA=(phiSteps-prevPhiSteps) % fullRotation;
11: if deltaPhiA>fullRotation/2 then
12:     deltaPhiA-=fullRotation;
13: else if deltaPhiA<-fullRotation/2 then
14:     deltaPhiA+=fullRotation;
15: deltaRadiusB=-radiusSteps-prevRadiusSteps;
16: deltaPhiB=phiSteps+(fullRotation/2)-prevPhiSteps;
17: deltaPhiB=deltaPhiB % fullRotation;
18: if deltaPhiB>fullRotation/2 then
19:     deltaPhiB-=fullRotation;
20: else if deltaPhiB<-fullRotation/2 then
21:     deltathetaB+=fullRotation;
22: pathA=Max (abs(deltaRadiusA), abs(deltaPhiA));
23: pathB=Max (abs(deltaRadiusB), abs(deltaPhiB));
24: if pathA<pathB then
25:     deltaPhiSteps=deltaPhiA;
26:     deltaRadiusSteps=deltaRadiusA;
27: else
28:     deltaPhiSteps=deltaPhiB;
29:     deltaRadiusSteps=deltaRadiusB;
30: deltaHeightSteps=heightSteps-prevHeightSteps;
```

Example Embodiments

One implementation of embodiments of the invention uses NVIDIA Flex (see developer.nvidia.com.flex) for fluid particle simulation and Unreal Engine 4 (see unrealengine.com/en-US/what-is-unreal-engine-4) for virtual scene composition and rendering. The physical vessel or bucket (container) is equipped with an HTC Vive VR controller for augmented tracking of the bucket's repositioning and/or reorientation (for example, rotation) to acquire the virtual coordinates in the Unreal Engine scene. Together, this achieves an augmented tracking and fluid simulation performance of 60 frames per second. One embodiment computes the motor positions using the aforementioned virtual-to-physical coordinate translation and transmits the motor commands over Bluetooth to the bucket's microcontroller, which actuates the motor control. As the range of values never exceeds 16 bits, the motor commands can be simply sent as three 16-bit integers, resulting in a negligible network overhead of less than 10 ms. Altogether, the Flex/Unreal-based implementation of embodiments of the invention provide virtual fluid simulation attuned to the physical vessel and responsive motor commands for coupled virtual-physical simulation.

User Study Evaluation

While interacting with a fluid-based haptic system is a novel interaction modality in mixed reality environments, the tasks involved are substantially identical to real-life experiences. As discussed before, one of the advantages of a dynamic haptic proxy device is the familiarity of the users with the passive proxy. As such, the familiarity with the vessel complement the unfamiliar mechanical system.

The coupling of the virtual fluid seen through the VR headset and the haptic feedback received from the physical vessel guide user interactions and assist them in making adjustments to the tasks they perform. A goal of the user study was to evaluate the effectiveness of embodiments in informing the experiences of the users in augmented fluid situations. Another goal of the study was to explore the nuances of interacting with an augmented fluid vessel.

Figure 8A:
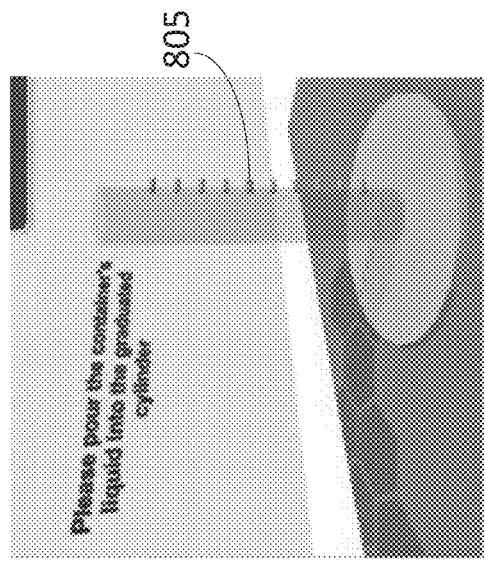
FIGS. 8A and 8B illustrate VR scene composition and a graduated cylinder as used in a study of embodiments of the invention.

A user study was conducted to evaluate the perceived realism of embodiments of the invention in providing the tactile sensations of interacting with virtual fluids. A hypothesis of the study was that embodiments of the invention outperform an incongruent solid proxy and closely match a congruent fluid proxy. To this end, the study involved a virtual scene, including three virtual-physical vessel buckets and two virtual liquids with different simulated viscosities. FIG. 8A displays the scene.

Through HTC Vive Lighthouse trackers, virtual vessels, or virtual buckets were mapped to three physical vessels, or buckets, in a study room. In the virtual world, the buckets were identical in shape and size. Similarly, in the physical world, all of the buckets had the same size, shape, and weight (e.g., 1477 g). However, the physical buckets exhibited different contents: Bucket 1 included an embodiment of the invention, Bucket 2 held water (congruent fluid proxy), and Bucket 3 was empty (incongruent solid proxy).

The location of the table was mapped so that users could pick up and set down the buckets on a known surface. During the study, a proctor communicated with participants through headphones via an external microphone. Throughout the interaction participants could hear a white noise through the headphones, which damped environmental noises (but was not wholly effective in masking all motor noise).

Phase 1—Closed Bucket Interactions

Task and Procedure

While wearing the VR headset, participants were tasked with using each bucket to perform the six characteristic actions from FIG. 1: Sway, Swirl, Pour/Flip, Roll, Jump, and Sautée. To prepare for each action, participants watched a 5-second video tutorial of how to perform the action in the virtual scene and repeated the action for each bucket. A Latin square design was used to counter-balance the order of the buckets.

After each action, users were prompted to respond to a statement in the scene: "Tactile sensation of handling the liquid using this haptic input device was accurate". Participants could answer the questionnaire by pointing Vive controllers to choose how they felt about the statement: Strongly Disagree, Disagree, Undecided, Agree, Strongly Agree. Participants were allowed to repeat actions and change responses before submission. The first part of Phase 1 was performed with a virtual liquid with a low simulated viscosity. After completion of all actions, the virtual liquid was switched to another virtual liquid with a higher simulated viscosity. For the entire duration of this phase, participants wore the headset for 20 minutes.

Results

Figure 9A:
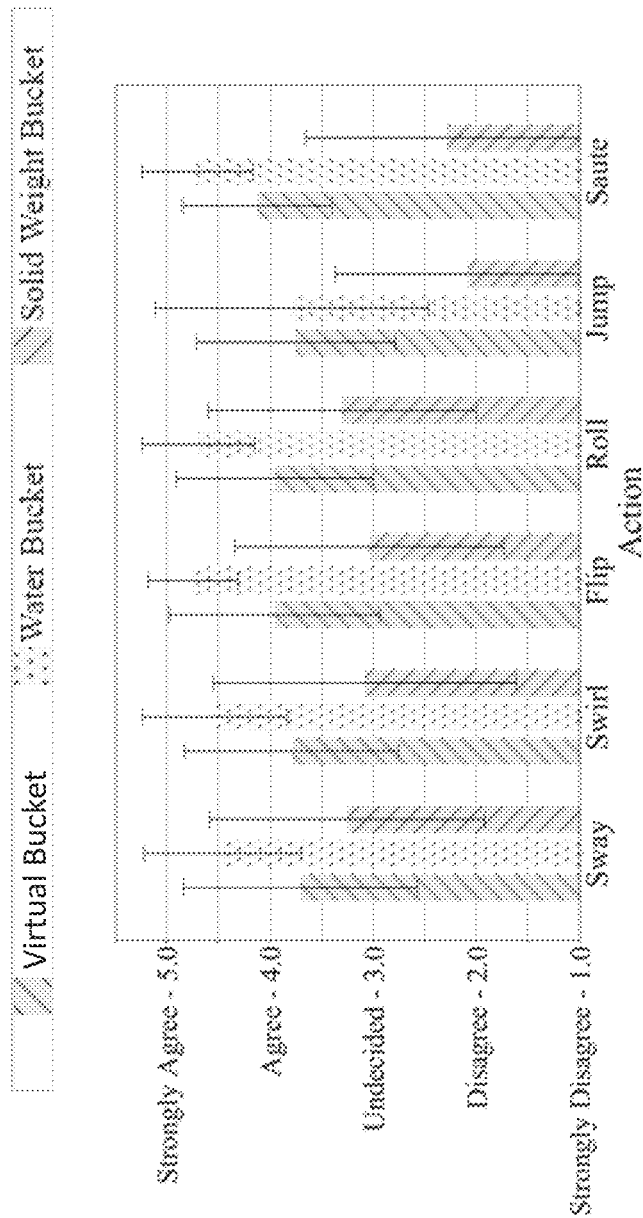
FIGS. 9A and 9B graphically depict user study responses for fidelity of actions with virtual fluid in a closed virtual vessel in accordance with embodiments of the invention, a water vessel, and an empty vessel.

FIG. 9A displays the aggregate results of the user responses. For all actions, users on average agreed that both the embodiments of the invention bucket and the water bucket gave appropriate tactile sensations of handling the liquid. For non-Jump/Sauté actions with the empty bucket, users were undecided about the accuracy of the tactile sensation of the empty bucket. For Jump/Sauté actions with the empty bucket, users reported that they disagreed that the water bucket gave accurate tactile sensations.

While performing the actions with the low viscosity liquid, embodiments of the invention outperformed the solid empty bucket in all actions and came close to providing comparative sensations with the water bucket. For the jump task, embodiments of the invention (M=3.75, SD=0.98) was rated closest to the water bucket (M=3.79, SD=1.35) in providing an accurate tactile sensation.

Figure 9B:
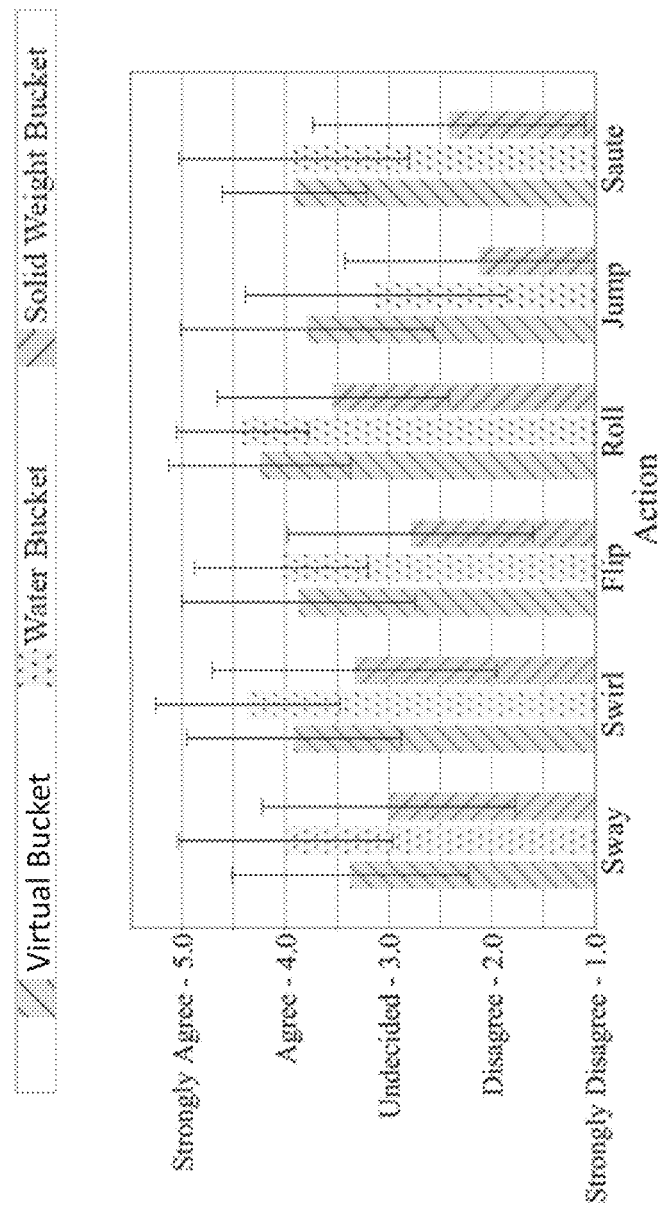

As shown in FIG. 9B for the virtual liquid with high viscosity, users reported similarly positive feedback while using embodiments of the invention. However, the water bucket felt slightly less accurate when being paired with the lower viscous liquid. For this phase embodiments of the invention outperformed the solid empty bucket again. For the jump task, embodiments of the invention (M=3.79, SD=1.25) outperformed the bucket filled with water (M=3.12, SD=1.29) in providing an accurate tactile sensation. In sauté action, embodiments of the invention were perceived as providing a similar tactile sensation to the water bucket (M=3.91, SD=0.71, Bucket with water: M=3.91, SD=1.13). Embodiments of the invention were perceived positively in Flip and Roll actions.

Discussion

The data supports the hypothesis that embodiments of the invention provide realistic tactile sensations compared to an incongruent solid proxy (empty solid bucket). For both virtual liquids, users felt that the solid mass bucket was unable to provide an accurate and realistic sensation of handling a fluid. Meanwhile, users agreed that embodiments of the invention did provide accurate tactile sensations.

However, embodiments of the invention did not quite match the strength of user response toward the congruent fluid proxy (water bucket). Even when the viscosity of simulated liquid was higher than real water in four out of six actions, users seemed to slightly prefer the bucket filled with water over embodiments of the invention. Analyzing the responses and cross-referencing with testimonials questionnaire revealed that several factors were involved in this finding. Embodiments of the invention in their current form is connected to the Arduino microcontroller using several wires from the top and bottom of the housing. While handling embodiments of the invention for each action, some users reported difficulty in handling the bucket, due to wires obstructing the flow of action. Also, in the post-study evaluation, users mentioned that they thought the simulated low viscosity liquid was in fact supposed to appear and feel like water and interacting with it using a bucket filled with water was considered more natural. (This was despite the fact that proctor referred to the simulated liquid as liquid one and liquid two). Furthermore, some users reported that the sounds of the real water assisted in the realistic multi-modal perception of the virtual fluid.

Phase 2—Open Bucket Interactions

Task and Procedure

The second phase of the study focused on performing a pouring task with an open bucket. After a short break, and wearing the headset again, participants entered another scene with a similar composition as the first one, with the addition of a graduated cylinder, seen in FIG. 8B. The participants were asked to pour a virtual liquid inside each bucket in FIG. 8A into the graduated cylinder in FIG. 8B until it reached mark 805. A separate Latin square design was used to counter-balance the order of the buckets. This task was repeated for all buckets and participants had the option of repeating the task if they chose to.

Users were asked to perform the first part of Phase 2 with a virtual liquid with low viscosity. After the completion of the pouring action with all three buckets, the virtual liquid was switched to a higher viscosity. After performing each pouring action, participants were prompted to respond to the same statement in the virtual scene: "Tactile sensation of handling the liquid using this haptic input device was accurate". The virtual liquid's level poured into the graduated cylinder for each bucket and simulated liquid was also recorded.

Results

Figure 10:
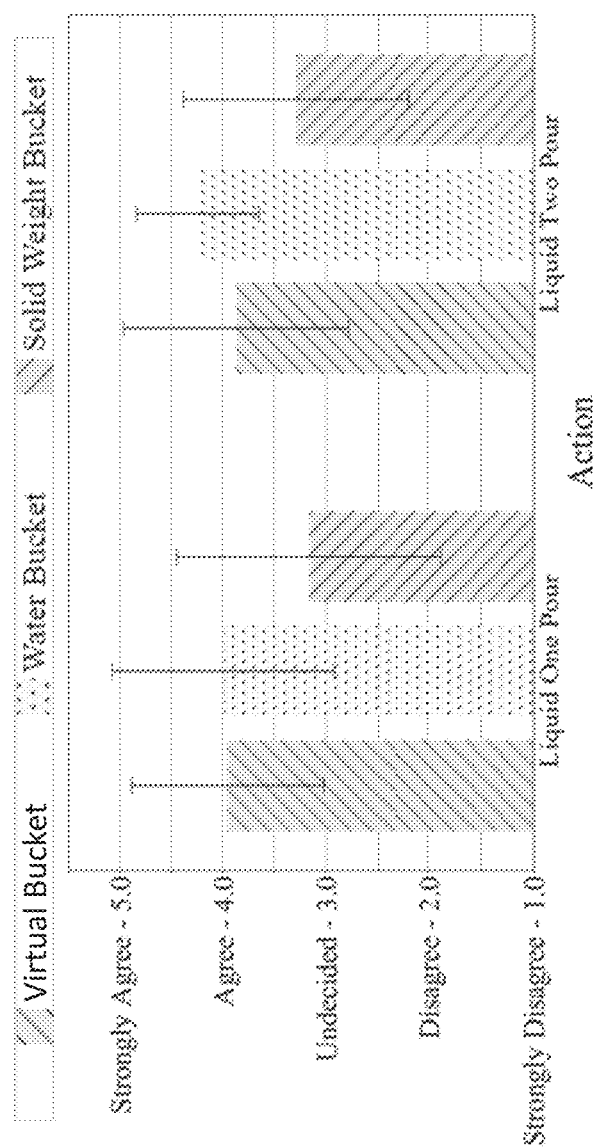
FIG. 10 graphically depicts user-reported fidelity of pouring from an open virtual vessel in accordance with embodiments of the invention, a water vessel, and an empty vessel.

FIG. 10 shows the aggregate users' responses to the accuracy of tactile sensation while performing this task. For both scenes, users on average reported that both embodiments of the invention and the water bucket felt accurate, while remaining undecided about the empty bucket. In the first scene with the low viscosity liquid, the bucket filled with water was rated more accurate, followed by embodiments of the invention (M=3.95, SD=0.95), and the solid empty bucket (M=3.16, SD=1.3). In the second scene with raised viscosity, embodiments of the invention (M=3.87, SD=1.11) performed close to the bucket filled with water (M=4.25, SD=0.60) and outperformed the solid empty bucket (M=3.29, SD=1.12).

Figure 8B:
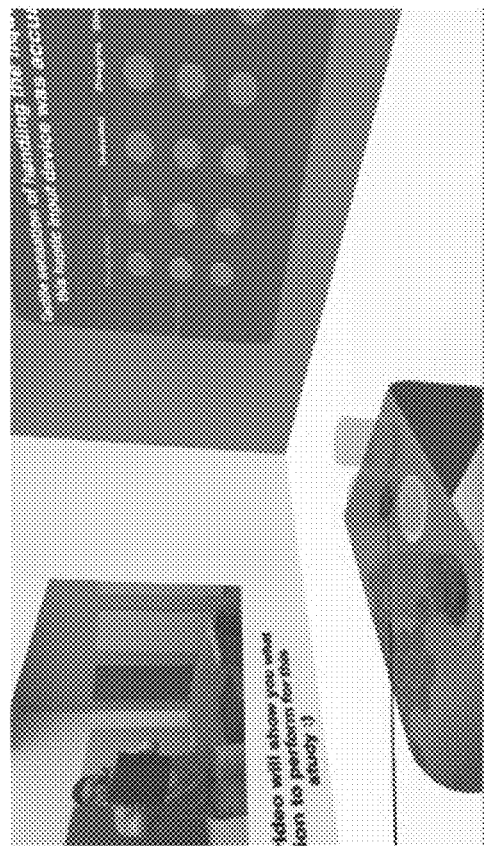

The graduated cylinder depicted in FIG. 8B was designed to hold 650 particles when filled up to notch 805. In the first scene with low viscosity simulated liquid, users were most successful when using the water bucket (M=671.25, SD=84.23) followed by the solid empty bucket (M=692.83, SD=89.27) and then embodiments of the invention (M=714.46, SD=102.79). In the second scene with the higher viscosity simulated liquid bucket filled with water was again successful in assisting the users in performing this task (M=669.875, SD=92.11) followed by embodiments of the invention (M=718.71, SD=99.01) and solid mass empty bucket (M=724.91, SD=132.46).

Discussion

This phase provided further support for the hypothesis towards the ability of embodiments of the invention to provide accurate tactile sensation. The study provides strong motivation towards the further development of smoother and/or shock-absorbed motor actuation.

User Feedback

As shown in the table in FIG. 11, users responded positively to using embodiments of the invention as a haptic interface (M=4.17, SD=0.76). Analyzing responses to the testimonials revealed that responsiveness of the apparatus had a major impact in improving tactile perception. One participant mentioned that: "It was an interesting experience. In my opinion it was extremely responsive to my movements, and I was impressed with its detection of my actions." Another participant wrote that: "It gave an accurate example of the different tests and which one was the most accurate as far as feelings went." Others mentioned that embodiments of the invention was effective in: providing a realistic sensation of weight and its distribution, high responsiveness, smooth movements of the motorized mechanism, adaptivity to different viscosity.

According to embodiments of the invention, a method is provided for creating a haptic sensation that represents a motion of a fluid in a container that is manipulated by, e.g., in contact with a hand of, a user, the method involving a first programmable controller that activates at least one of the first, second, and third motors of a mechanically-actuated system to effectuate repositioning of a CoG of said system in a motion representing the motion of the fluid, e.g., a swirling motion, or a swishing motion, or a tilting motion, etc., or a combination thereof. The motors are disposed in mechanical cooperation with the container, wherein each of the first, second, and third motors is configured to be moved along corresponding first, second, and third path wherein said repositioning causes a first change in acceleration of the container. A second programmable controller acquires first data representing said change, and forms, with the use of opto-electronic circuitry that is governed by said second programmable controller and that is optically cooperated with a visual system of the user, a visually-perceivable sequence of images representing a second change of orientation of the container in space. The sequence of images is temporally coordinated with a change in haptic sensation in the user's hand caused by the first change.

According to the embodiment, the mechanically-actuated system has a center-of-gravity (CoG) and first and second states respectively corresponding to a minimum position and a maximum position of the CoG.3. According to the embodiment, the first motor is configured to move, in response to a first signal received from the first programmable controller, along a first linear path defined by a mechanical axis, the second motor is configured to move, in response to a second signal received from the first programmable controller, along a linear radial path defined in a plane perpendicular to the mechanical axis, and the third motor is configured to generate an azimuthal motion in said plane, in response to a third signal received from the first programmable controller. According to this embodiment, the third motor is configured to move at least one of the first and second motors in said plane. In one embodiment, the third motor is disposed outside the container.

According to the embodiments, each image of the sequence of images includes a fluid in the container, wherein a volume of the fluid is defined by a pre-defined set of data including fluid density and fluid viscosity, and wherein at least one of position and orientation of said volume in the image is represented by a position of the CoG with respect to a system of coordinates associated with the container. In one embodiment, at least one of the position and orientation of the volume is determined, with the second programmable controller, in a cylindrical system of coordinates. According to the embodiments, the container is devoid of fluid.

According to one embodiment, the forming step includes forming the visually-perceivable sequence of images representing the fluid shifting in the container according to laws of fluid dynamics, wherein the container in contact with the hand of the user is empty.

Illustrative Computing Environment in Accordance with Certain Embodiments

FIG. 12 illustrates a diagrammatic representation of a machine 1200 in the exemplary form of a computer system, in accordance with one embodiment, within which a set of instructions, for causing the machine 1200 to perform any one or more of the methodologies discussed herein, may be executed. In alternative embodiments, the machine may be connected, networked, interfaced, etc., with other machines in a Local Area Network (LAN), a Wide Area Network, an intranet, an extranet, or the Internet. The machine may operate in the capacity of a server or a client machine in a client-server network environment, or as a peer machine in a peer to peer (or distributed) network environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1200 includes a processor 1202, a main memory 1204 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), etc.), and a secondary memory 1218, which communicate with each other via a bus 1230. Main memory 1204 includes information and instructions and software program components necessary for performing and executing the functions with respect to the various embodiments of the systems, methods for implementing embodiments of the invention described herein. Instructions may be stored within main memory 1204. Main memory 1204 and its sub-elements are operable in conjunction with processing logic 1226 and/or software 1222 and processor 1202 to perform the methodologies discussed herein.

Processor 1202 represents one or more devices such as a microprocessor, central processing unit, or the like. More particularly, the processor 1202 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1202 may also be one or more devices such as an application specific integrated circuit (ASIC), a field programmable gate array (FPGA), a digital signal processor (DSP), network processor, or the like. Processor 1202 is configured to execute the processing logic 1226 for performing the operations and functionality which are discussed herein.

The computer system 1200 may further include one or more network interface cards 1208 to interface with the computer system 1200 with one or more networks 1220. The computer system 1200 also may include a user interface 1210 (such as one or more of a virtual reality headset, a video display unit, a liquid crystal display (LCD), or a cathode ray tube (CRT)), an alphanumeric input device 1212 (e.g., a keyboard), a cursor control device 1214 (e.g., a mouse), and a signal generation device 1216 (e.g., an integrated speaker). The computer system 1200 may further include peripheral device 1236 (e.g., wireless or wired communication devices, memory devices, storage devices, audio processing devices, video processing devices, etc.). The computer system 1200 may perform the functions of the embodiments as described herein.

The secondary memory 1218 may include a non-transitory machine-readable storage medium (or more specifically a non-transitory machine-accessible storage medium) 1231 on which is stored one or more sets of instructions (e.g., software 1222) embodying any one or more of the methodologies or functions described herein. Software 1222 may also reside, or alternatively reside within main memory 1204, and may further reside completely or at least partially within the processor 1202 during execution thereof by the computer system 1200, the main memory 1204 and the processor 1202 also constituting machine-readable storage media. The software 1222 may further be transmitted or received over a network 1220 via the network interface card 1208.

Some portions of this detailed description are presented in terms of algorithms and representations of operations on data within a computer memory. These algorithmic descriptions and representations are the means used by those skilled in the data processing arts to most effectively convey the substance of their work to others skilled in the art. An algorithm is here, and generally, conceived to be a sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from this discussion, it is appreciated that throughout the description, discussions utilizing terms such as "processing" or "computing" or "calculating" or "determining" or "displaying" or the like, refer to the action and processes of a computer system or computing platform, or similar electronic computing device(s), that manipulates and transforms data represented as physical (electronic) quantities within the computer system's registers and memories into other data similarly represented as physical quantities within the computer system memories or registers or other such information storage, transmission or display devices.

In addition to various hardware components depicted in the figures and described herein, embodiments further include various operations which are described below. The operations described in accordance with such embodiments may be performed by hardware components or may be embodied in machine-executable instructions, which may be used to cause a purpose processor programmed with the instructions to perform the operations. Alternatively, the operations may be performed by a combination of hardware and software, including software instructions that perform the operations described herein via memory and one or more processors of a computing platform.

Embodiments of invention also relate to apparatuses for performing the operations herein. Some apparatuses may be specially constructed for the required purposes, or selectively activated or configured by a computer program stored in one or more computers. Such a computer program may be stored in a computer readable storage medium, such as, but not limited to, any type of disk including optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms presented herein are not inherently related to any particular computer or other apparatus. In addition, embodiments of the invention are not described with reference to any particular programming language. It will be appreciated that a variety of programming languages may be used to implement the embodiments of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices, etc.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims that follow. Features of the disclosed embodiments can be combined and rearranged in various ways.

What is claimed is:

1. An apparatus, comprising:
    a physical vessel containing a solid object and mechanical means to move the solid object therein;
    a virtual reality module to track a position of the physical vessel and a corresponding virtual vessel;
    logic to simulate a fluid contained in the virtual vessel based on the tracked position of the virtual vessel;
    logic to calculate coordinates of a center of gravity for the simulated fluid based on the tracked position of the virtual vessel;
    logic to translate the calculated coordinates of the center of gravity for the simulated fluid into cylindrical coordinates to which to move the solid object in the physical vessel; and
    logic to send instructions to the mechanical means to move the solid object in the physical vessel based on the cylindrical coordinates to shift the weight of the physical vessel in accordance with the center of gravity of the simulated fluid in the virtual vessel.

2. The apparatus of claim 1, further comprising logic to generate the instructions to send to the mechanical means to move the solid object in the physical vessel based on the cylindrical coordinates.

3. The apparatus of claim 1, further comprising logic to modify the instructions based on limitations of the mechanical means.

4. The apparatus of claim 3, wherein the logic to modify the instructions based on limitations of the mechanical means comprises logic to modify the instructions based on one or more of a maximum speed, direction, and distance, of the mechanical means to move the solid object.

5. The apparatus of claim 3, wherein the logic to modify the instructions based on limitations of the mechanical means comprises logic to modify the instructions based on a periodicity of the instructions.

6. The apparatus of claim 1,
    wherein the mechanical means comprises three motors coupled to an adjustable mechanical structure,
    wherein the solid object is fixed to the adjustable mechanical structure, and
    wherein the logic to send instructions to the mechanical means to move the solid object in the physical vessel based on the cylindrical coordinates comprises logic to send instructions to the motors to adjust the mechanical structure and thereby move the solid object fixed thereto based on the cylindrical coordinates.

7. The apparatus of claim 6, wherein the logic to send instructions to the motors to adjust the mechanical structure and thereby move the solid object fixed thereto based on the cylindrical coordinates comprises proportional-integral-derivative logic to send instructions to control the motors to adjust the mechanical structure and thereby move the solid object fixed thereto based on the cylindrical coordinates.

8. A method, comprising:
    providing a physical vessel containing a solid object and mechanical means to move the solid object therein;
    tracking, with a virtual reality module, a position of the physical vessel and a corresponding virtual vessel;
    simulating a fluid contained in the virtual vessel based on the tracked position of the virtual vessel;
    calculating coordinates of a center of gravity for the simulated fluid based on the tracked position of the virtual vessel;
    translating the calculated coordinates of the center of gravity for the simulated fluid into cylindrical coordinates to which to move the solid object in the physical vessel; and
    transmitting instructions to the mechanical means to move the solid object in the physical vessel based on the cylindrical coordinates to shift the weight of the physical vessel in accordance with the center of gravity of the simulated fluid in the virtual vessel.

9. The method of claim 8, further comprising generating the instructions to send to the mechanical means to move the solid object in the physical vessel based on the cylindrical coordinates.

10. The method of claim 8, further comprising modifying the instructions based on limitations of the mechanical means.

11. The method of claim 10, wherein modifying the instructions based on limitations of the mechanical means comprises modifying the instructions based on one or more of a maximum speed, direction, and distance, of the mechanical means to move the solid object.

12. The method of claim 10, wherein modifying the instructions based on limitations of the mechanical means comprises modifying the instructions based on a periodicity of the instructions.

13. The method of claim 8,
    wherein the mechanical means comprises three motors coupled to an adjustable mechanical structure,
    wherein the solid object is fixed to the adjustable mechanical structure, and
    wherein transmitting instructions to the mechanical means to move the solid object in the physical vessel based on the cylindrical coordinates comprises transmitting instructions to the motors to adjust the mechanical structure and thereby move the solid object fixed thereto based on the cylindrical coordinates.

14. Non-transitory computer readable storage media having instructions stored thereon that, when executed by a processor of a system, cause the system to perform operations comprising:
    providing a physical vessel containing a solid object and mechanical means to move the solid object therein;
    tracking, with a virtual reality module, a position of the physical vessel and a corresponding virtual vessel;
    simulating a fluid contained in the virtual vessel based on the tracked position of the virtual vessel;
    calculating coordinates of a center of gravity for the simulated fluid based on the tracked position of the virtual vessel;

translating the calculated coordinates of the center of gravity for the simulated fluid into cylindrical coordinates to which to move the solid object in the physical vessel; and transmitting instructions to the mechanical means to move the solid object in the physical vessel based on the cylindrical coordinates to shift the weight of the physical vessel in accordance with the center of gravity of the simulated fluid in the virtual vessel.

15. The non-transitory computer readable storage media of claim 14, further comprising generating the instructions to send to the mechanical means to move the solid object in the physical vessel based on the cylindrical coordinates.

16. The non-transitory computer readable storage media of claim 14, further comprising modifying the instructions based on limitations of the mechanical means.

17. The non-transitory computer readable storage media of claim 16, wherein modifying the instructions based on limitations of the mechanical means comprises modifying the instructions based on one or more of a maximum speed, direction, and distance, of the mechanical means to move the solid object.

18. The non-transitory computer readable storage media of claim 16, wherein modifying the instructions based on limitations of the mechanical means comprises modifying the instructions based on a periodicity of the instructions.

19. The non-transitory computer readable storage media of claim 14,
wherein the mechanical means comprises three motors coupled to an adjustable mechanical structure,
wherein the solid object is fixed to the adjustable mechanical structure, and
wherein transmitting instructions to the mechanical means to move the solid object in the physical vessel based on the cylindrical coordinates comprises transmitting instructions to the motors to adjust the mechanical structure and thereby move the solid object fixed thereto based on the cylindrical coordinates.

* * * * *